United States Patent [19]

Kitaoka et al.

[11] Patent Number: 5,063,798
[45] Date of Patent: Nov. 12, 1991

[54] RUNNING CIRCULAR PIPE CUTTING DEVICE

[75] Inventors: Takeo Kitaoka; Nagahiro Akiyoshi, both of Amagasaki, Japan

[73] Assignee: Nisshin Steel Co., Ltd., Tokyo, Japan

[21] Appl. No.: 483,493

[22] Filed: Feb. 22, 1990

[30] Foreign Application Priority Data

Feb. 23, 1989 [JP] Japan ................................ 1-43612

[51] Int. Cl.⁵ .............................................. B23B 13/00
[52] U.S. Cl. .......................................... 82/124; 82/59;
83/87; 83/329
[58] Field of Search .......................... 83/87, 329, 185;
82/70.1, 70.2, 71, 83, 63, 59, 70, 124

[56] References Cited

U.S. PATENT DOCUMENTS 4,111,346 9/1978 Bertolette .............................. 82/59

Primary Examiner—W. Donald Bray
Attorney, Agent, or Firm—Koda and Androlia

[57] ABSTRACT

A device for cutting a pipe including a first carriage, which is movable on the base of the device and has an outer cutter, and a second carriage mounted on the first carriage. The second carriage includes a plurality of guide rods arranged on a support arm so that when the support arm is rotated the guide rods draw a circle and the pipe is fed to fit on each of the guide rods interchangeably. Each guide rod has an inner cutter so that the outer cutter in cooperation with the inner cutter cuts the pipe while the first carriage is moved in the direction in which the pipe is fed into the device.

2 Claims, 5 Drawing Sheets

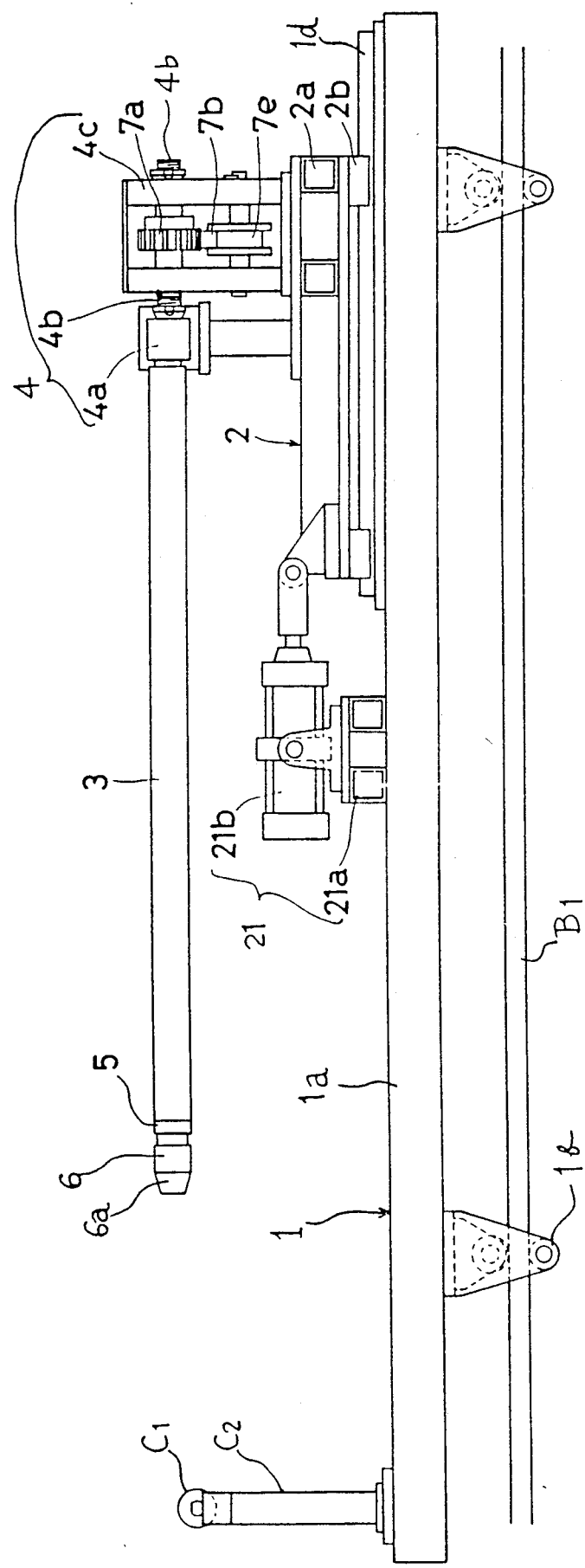

RUNNING CIRCULAR PIPE CUTTING DEVICE

BACKGROUND OF THE INVENTION

1. Field of the Invention

The present invention relates to a device for cutting a running circular pipe.

2. Prior Art

As well known conventionally, in forming a circular pipe, a strip plate is first recoiled from a thick strip coil and then gradually formed into a circular shape along a longitudinal axis. The opposite edges of the strip are then welded to form a circular pipe.

Such a device used to cut the pipe thus formed into a certain length in a pipe forming line is structured as follows: A carriage is installed so that it is underneath the pipe fed into the device. A pipe carriage is installed in parallel with the axial direction of the pipe, and a cutting means is mounted on the carriage. The carriage reciprocates at the same speed as the circular pipe so that a circular cutter (such as an abrasive wheel, metal saw, etc.) cuts the pipe at a right angle with the axis of the pipe.

However, if the pipe is made of a thin plate material, it is likely that dents will form on the pipe when the edges of the cutter hit the pipe. Also, many burrs may form at the cutting edges of the pipe. Since pipes with dents and burrs are not usable as is, they must be cut further in additional next step, resulting in waste of pipe materials, and the necessity of another apparatus for the additional cutting.

SUMMARY OF THE INVENTION

Accordingly, it is an object of the present invention to overcome the problems found in prior art pipe cutting system and provide a device which can cut a circular pipe in a pipe forming line in a factory.

The objects are accomplished by a unique structure of a running circular pipe cutting device wherein: a circular pipe is horizontally fed into the device in its axial direction; a first carriage is mounted on the base of the device so that it reciprocates underneath and parallel with the circular pipe; an outer cutter driver, which has a hollow shaft through which the circular pipe is fed, is mounted on the first carriage, and a circular outer cutter is provided at the pipe outlet of the hollow shaft so that the circular cutter rotates around its own axis and around the axis of the hollow shaft; a second carriage is mounted on the first carriage to reciprocate in a direction parallel with the circular pipe; a rod support is rotatably mounted on the second carriage, and a plurality of guide rods, with their axes extending in a direction opposite to the direction in which the circular pipe is fed, are detachably mounted to the rod support, the guide rods onto which the circular pipe is fitted are parallel to each other and provided at points which are equal in distance from the rotating center of the rod support, and a circular inner cutter and a guide member are attached at the free end of each of the guide rods; and a rod support rotating means is mounted on the second carriage so as to intermittently rotate the rod support.

BRIEF DESCRIPTION OF THE DRAWINGS

FIG. 4 shows a back side view of FIG. 1;

DESCRIPTION OF THE INVENTION

Figure 1:
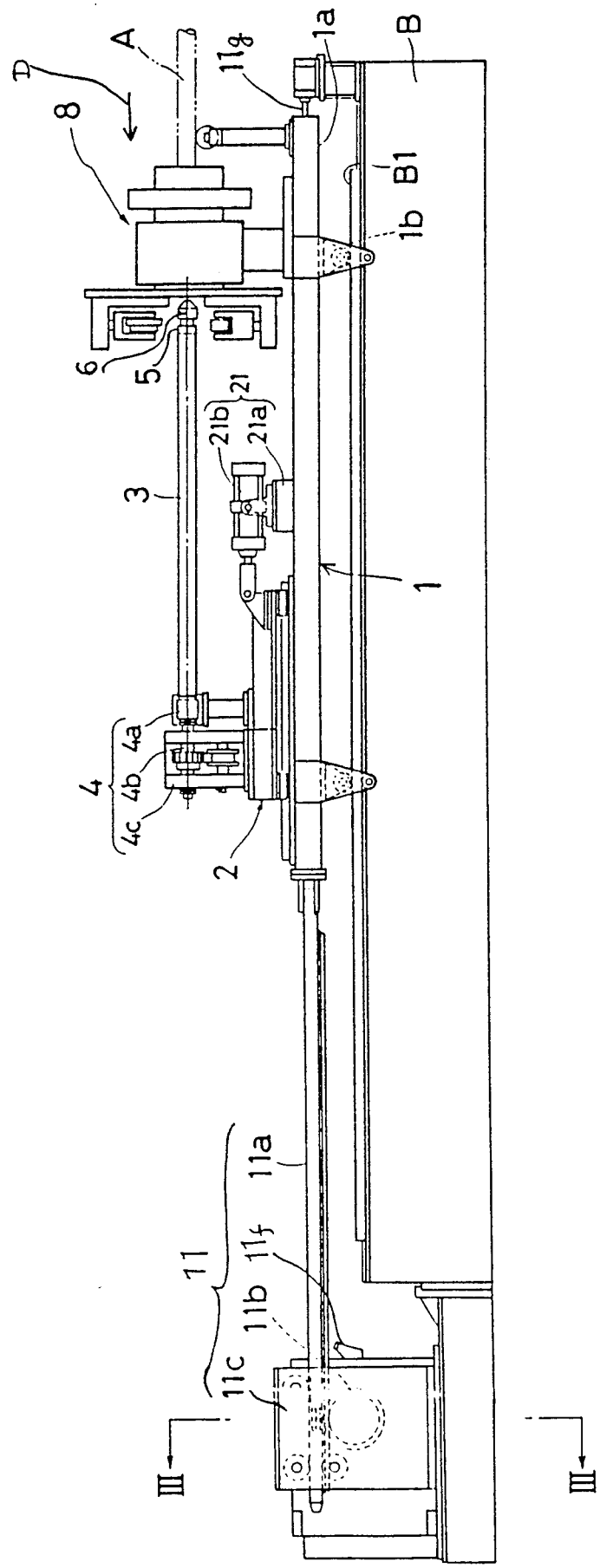
FIG. 1 shows a schematic front view of the pipe cutting device according to the present invention.
Figure 2:
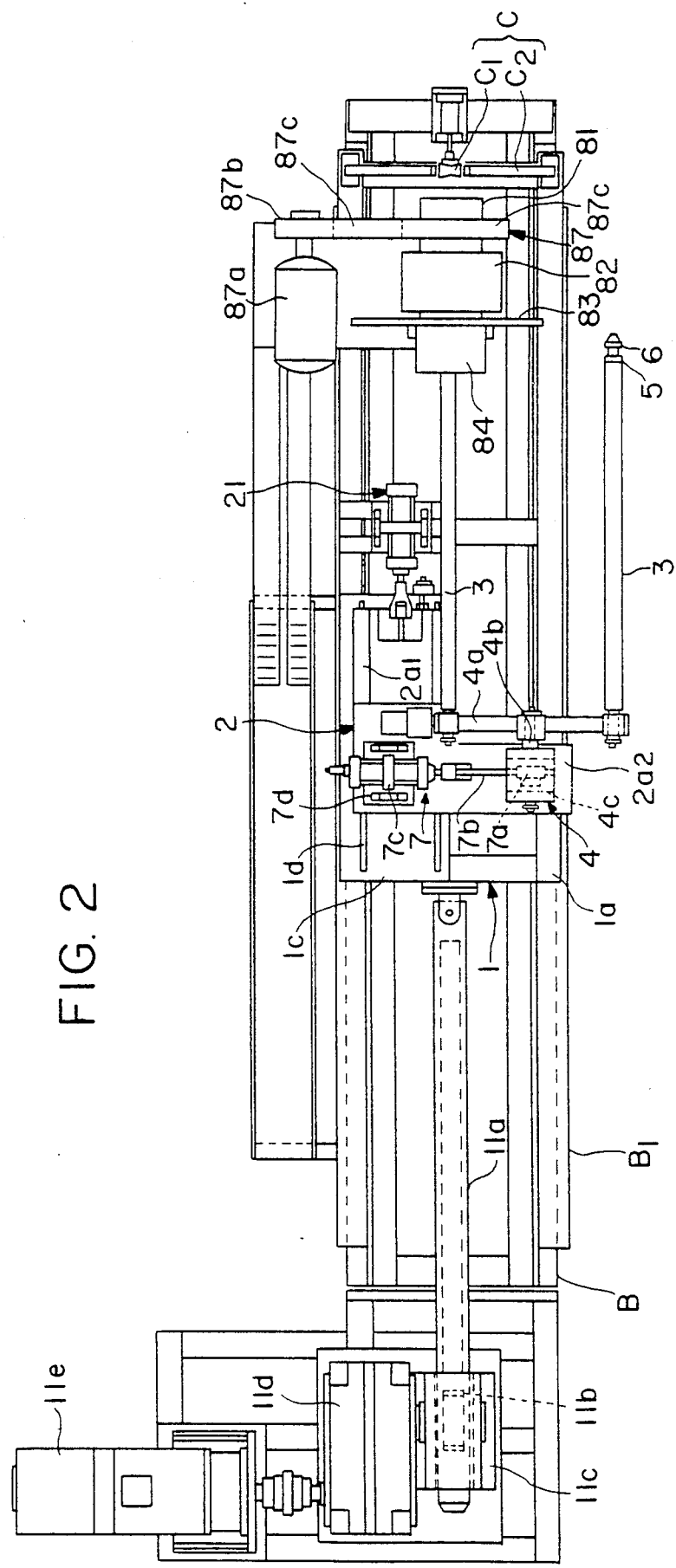
FIG. 2 shows a top plan view of FIG. 1.
Figure 3:
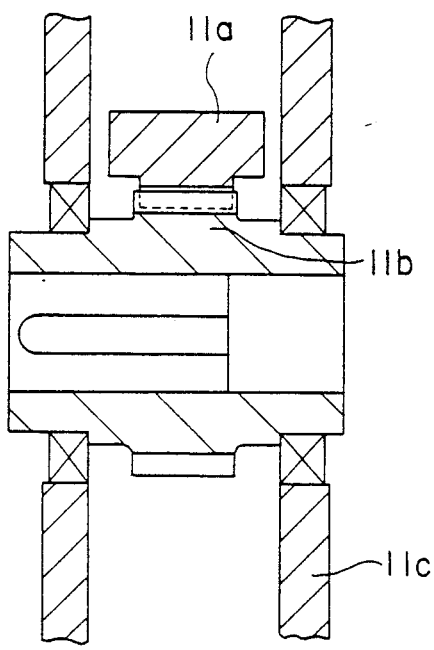
FIG. 3 shows a cross sectional view taken along the line III—III of FIG. 1.

As shown in FIG. 1 and FIG. 2, in the device of the present invention, a circular pipe A is kept substantially horizontal and runs or is fed in its axial direction as shown by the arrow D.

The direction of the pipe A is defined in the specification as follows: The direction of the circular pipe moving (or fed) forward (or the direction of the arrow D) is the "running direction" (to the left in FIG. 1); backward movement of the pipe (or the direction opposite the arrow D) is the "anti-running direction" (to the right in FIG. 1); and the horizontal radial direction of the pipe is the "transverse direction" (perpendicular to the drawing sheet).

Underneath the circular pipe A, a first carriage 1 is movably mounted on a pair of rails B1 on a base B so that the first carriage 1 reciprocates in a direction in parallel with the axis of the circular pipe A.

On the first carriage 1, an outer cutter driver 8 is mounted. The circular pipe A is cut by this outer cutter driver 8 (as described later) while the first carriage 1 is moving at the same speed as the (advancing speed of the) circular pipe A.

A carriage body or a carriage bed 1a, which is rectangular in shape (when viewed from the top), of the first carriage 1 is provided with a pair of wheels 1b so that the wheels 1b sandwich the rail B1 from the top and bottom. In total, four pairs of the wheels 1b are provided on the carriage body 1a.

Figure 6:
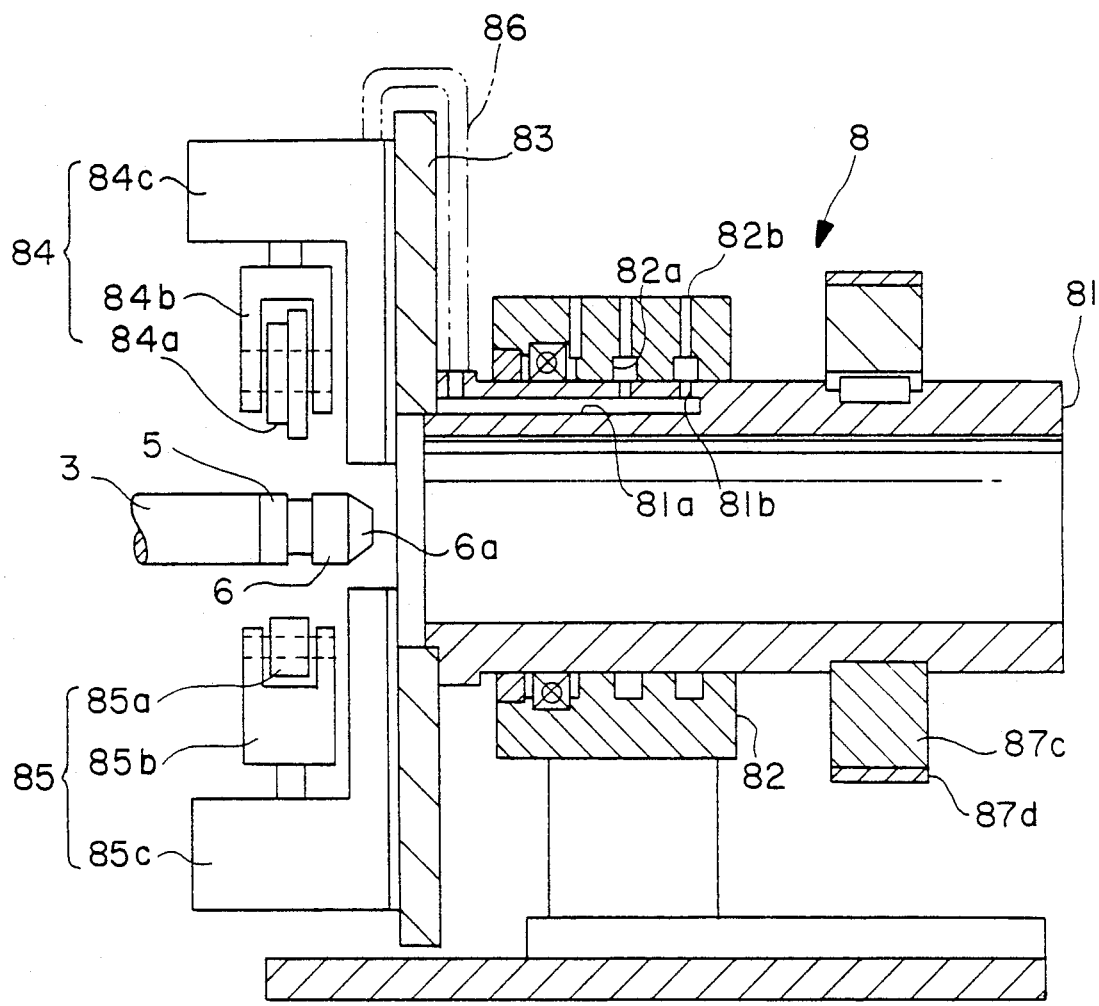
FIG. 6 shows an enlarged vertical sectional view of outer cutter driver.

The outer cutter driver 8 is from the prior art and is generally illustrated in FIG. 6. A hollow shaft 81 through which the circular pipe A is concentrically fed or runs is rotatably supported by a shaft support 82. A circular ring 83 with its edge extending outwardly in the radial direction is fixed to the circular pipe outlet of the hollow shaft 81, and an outer cutter section 84 and a back-up section 85 are mounted to the outer end surface of the circular ring 83.

The outer cutter section 84 and the back-up section 85 can advance toward each other to hold the circular pipe A in the diameter direction and then retreat to release the pipe A.

The outer cutting section 84 includes a freely rotatable circular outer cutter 84a, a support member 84b which supports the cutter 84a, and an air piston cylinder mechanism 84c which moves (or forces out and retrieves) the cutter 84a and support member 84b. The back-up section 85, like the cutting section 84, includes a freely rotatable roller 85a, a support member 85b which supports the roller 85a, and an air piston cylinder mechanism 85c.

A rotating driver 87 for the hollow shaft 81 includes, as seen in FIGS. 2 and 6, a motor 87a, a drive pulley 87b, a follow pulley 87c and a timing belt 87d.

In order to supply air to the piston cylinder mechanisms 84c and 85c via a hose 86, the hollow shaft 81 has an axial air passage 81a and radial air passages 81b. Corresponding to these air passages 81a and 81b, the shaft support 82 is provided with peripheral passages 82a and radial air passages 82b.

A driving section 11 shown in FIG. 1 for reciprocating the first carriage 1 is constructed as follows: A rack gear 11a extends from the front end (left side edge in the drawing) of the carriage body 1a. The rack gear 11a is in the direction that the circular pipe A is fed and in parallel with the axis of the circular pipe A. A pinion 11b meshing with the rack gear 11a is rotatably supported by a support member 11c so that the pinion 11b rotates at a right angle (90 degrees) to the rack gear 11a and the axis of the circular pipe A. The pinion 11b is connected to a motor 11e through a reduction gear 11d.

Attached to the front and back ends of the base B are a front stopper 11f and back stopper 11g, respectively.

Figure 5:
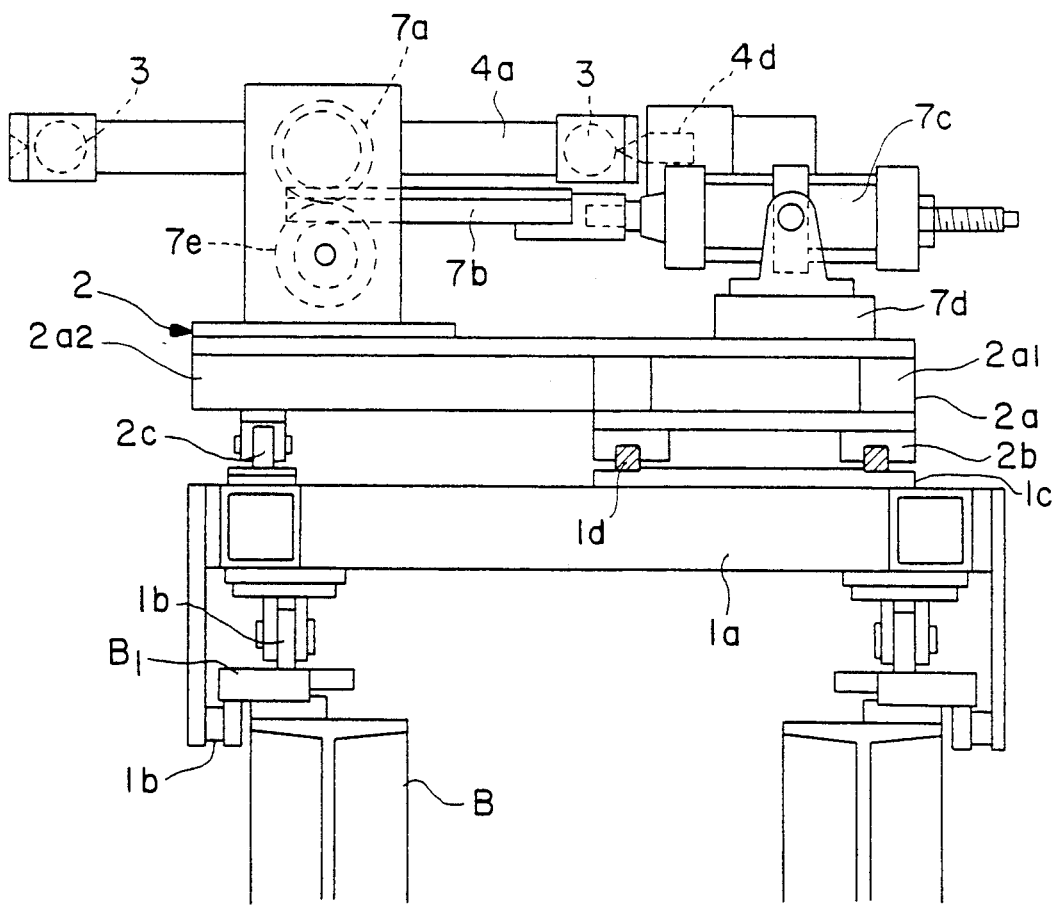
FIG. 5 shows a right side view of FIG. 4.

As shown in FIG. 2 and FIG. 5, a rest plate 1c is fixed on the right hand side (or on the right side of the axial direction of the circular pipe A) of the top surface of the carriage body 1a of the first carriage 1. Two rails 1d which are square in cross section are mounted on this rest plate 1c in parallel with the axial direction of the circular pipe A, and a second carriage 2 is movably mounted on these rails 1d to reciprocate.

The second carriage 2 includes a longitudinal member $2a_1$ which is above the rails 1d and a transverse member $2a_2$ which extends to the left (in FIG. 5). Thus, as a whole the second carriage 2 is in an L shape (when viewed from the top).

Under the longitudinal member $2a_1$, four sets of wheels (needle bearings) 2b are provided so that they fit on the rails 1d. Also, under the transverse member $2a_2$, a roller 2c is provided to fit on the longitudinal frame of the first carriage body 1a.

Reference numeral 21 in FIG. 1, FIG. 2 and FIG. 4 is a driving mechanism for the second carriage 2. The driving mechanism or driver 21 includes a mount 21a secured on the rest plate 1c of the first carriage 1 and a piston cylinder mechanism 21b which is mounted on the mount 21a via a pin. The piston cylinder mechanism 21b is connected to the second carriage 2.

Guide rods 3 (two rods shown in the drawing) in column shape are provided to extend (from a support arm 4a - described later) in the backward movement direction of the circular pipe A. The guide rods 3 are in parallel with each other and the circular pipe A. In addition, the guide rods 3 are positioned on the same circle on the support arm 4a. (In other words, the guide rods 3 are provided an equal distance from the rotating center of the support arm 4a so as to draw a circle when they are rotated.)

Each of the guide rods 3 is for fitting the circular pipe A on its outer surface. That is, when the circular pipe A is fed out the pipe outlet of the hollow shaft 81, it fits on each of the guide rods 3.

A rod support 4 for the guide rods 3 is mounted on the second carriage 2. The rod support 4 includes the support arm 4a, a support shaft 4b, a pair of support pillars 4c and a positioning member 4d. The support arm 4a detachably mounts the root ends of the guide rods 3 at the ends. The support shaft 4b is secured to the center of the support arm 4a so that the support shaft 4b is positioned at the center of the circle along which the guide rods 3 are arranged (or at the center of the circle which the guide rods 3 will draw when rotated) and rotate concentrically to such circle. The support pillars 4c are secured on the second carriage 2 and rotatably support the support shaft 4b. The positioning member 4d engages with a corn-shape hole provided at the opposite ends of the support arm 4a (see FIG. 5) to secure the horizontal position of the guide rods 3.

With the above structure, when the support arm 4a is rotated about the support shaft 4b, one of the guide rods 3 is positioned so that the guide rod 3 is concentric to the hollow shaft 81 and a free end of the rod 3 is in front of the pipe outlet of the hollow shaft 81 so that the circular pipe A is fitted on the guide rod 3.

As best seen in FIG. 4 and FIG. 6, a circular inner cutter 5 is detachably attached to the front or free end of each of the guide rods 3, and a guide member 6 is attached adjacent to the inner cutter 5 on the guide rod 3. The guide member 6 may be dismounted from the guide rod 3 and has a tapered surface 6a at its front end.

Rotating section 7 for rotating the support shaft 4b for the guide rods 3 is mounted on the second carriage 2. The rotating section 7, as seen in FIG. 2, FIG. 4 and FIG. 5, includes a pinion 7a concentrically installed to the support shaft 4b, a rack gear 7b meshing with the pinion 7a at its upper surface and extending in the transverse direction (to the axis of the circular pipe A), a piston cylinder mechanism 7c for reciprocating the rack gear 7b, stands 7d rotatably supporting the piston cylinder mechanism 7c, and a rack support roller 7e.

A guide roller C1 is provided at the rear end of the first carriage body 1a with its transverse shaft mounted on a support member C2.

In operation, the circular pipe A is fed to pass through the hollow shaft 81 of the outer cutter driver 8 as indicated by the arrow D in FIG. 1 (from the right to the left in the drawing). The circular pipe A is then fitted on the guide rod 3, and the front end of the circular pipe A guided by the guide member 6 reaches the root end of the guide rod 3.

Next, the first carriage 1 runs (or moves) forward (to the left in FIGS. 1 and 2) at the same speed as the circular pipe A, and during this running period the outer cutter driver 8 is activated to rotate the hollow shaft 81. The outer cutter 84a and the roll 85a holding the circular pipe A in between freely rotate about their axes and about the axes of the hollow shaft 87, and the outer cutter 84a begins to cut the pipe A from its outer surface in cooperation with the inner cutter 5.

When cutting is completed, the circular pipe A and the first carriage 1 stop and the second carriage 2 moves forward so that the guide rod 3 is moved in the running direction. At a position where the guide member 6 at the end of the guide rod 3 is away from the outer cutter 6 (or a certain distance is obtained between the guide member 6 and the cut end of the retained pipe A) the piston cylinder mechanism 7c operates to move the rack gear 7b and opinion gear 7a rotates to rotate the sports shaft 4b 180°. Then the guide rod 3 with the cutout pipe A moves away from the axis line of the hollow shaft 81 and another guide rod 3 coincides with the axial line of the hollow shaft 81. The portion of the pipe which is cut is removed (drawn out) from the guide rod 3 by the operator (in other words, remove from the guide rod 3 as shown at the bottom of FIG. 2). Then, the second carriage 2 moves backwards (to the right in FIG. 2) and stops so that the guide member 6 reaches a preset position which is inside the outer cutter driver 8 and in front of the pipe outlet of the hollow shaft 81.

After the above is completed, the first carriage 1 moves backwards and stops, and the circular pipe A remaining in the hollow shaft 81 is fitted on the guide rod 3 again. Then, the circular pipe A and the first carriage 1 run forward and the pipe A is cut.

The above described operation is repeated periodically to obtain cut-out pipes of a certain length.

As described above, according to the present invention, even a pipe made of thin plate can adequately be cut at a desired length on the same line that the pipe is formed on.

It is possible to design different embodiments without departing from the spirit and scope of this invention, and it should be understood that the present invention is not limited to the embodiments described in the specification.

We claim:

1. A running circular pipe cutting device comprising:
   a first carriage movably mounted on a base so that said first carriage reciprocates underneath a circular pipe in parallel with the axial direction of said circular pipe which runs in the axial direction horizontally;
   an outer cutter drive mounted on said first carriage, said outer cutter driver having a hollow shaft through which said circular pipe passes, a rotating driver for the hollow shaft, a circular ring with its edge extending outwardly in the radial direction being fixed to the circular pipe outlet of the horizontal shaft, a freely rotatable circular outer cutter mounted to the outer end surface of the circular ring, and a motive means for the outer cutter advancing toward the circular pipe and retreating;
   a second carriage movably mounted to reciprocate on said first carriage in parallel with the axial direction of said circular pipe;
   a plurality of guide rods extending in a direction opposite to the direction in which said circular pipe advances and in parallel with the axial direction of said circular pipe so that said circular pipe fits on the peripheral surface of said guide rods, said guide rods being positioned in parallel with each other;
   a support arm detachably mounting the root ends of the guide rod at the end;
   a support shaft secured to the center of the support arm so that the support shaft is positioned at the center of a circle along which the guide rods are arranged;
   a rotation part of said support shaft mounted on said second carriage so that the support shaft is rotated intermittently and stopped when each guide rod coincides with the center of the hollow shaft;
   a circular inner cutter detachably secured to the front end of said guide rod; and
   a guide member detachably secured adjacent to said circular inner cutter on the front end of said guide rod.

2. A device for cutting a pipe comprising:
   a base;
   a first carriage mounted on said base so that said first carriage reciprocates in the axial direction of said pipe and at the same speed as said pipe;
   an outer cutter driver mounted on said first pipe carriage, said outer cutter driver having a hollow shaft through which said circular pipe passes, a rotating driver for the hollow shaft, a circular ring with its edge extending outwardly and the radial direction being fixed to the circular pipe outlet of the hollow shaft, a freely rotatable circular outer cutter mounted to the outer end surface of the circular ring, and a motive means for the outer cutter advancing toward the circular pipe and retrieving;
   a second carriage movably mounted to reciprocate on said first carriage in parallel with the axis of said circular pipe; and
   a rod support mounted on said carriage, said rod support comprising;
   an intermittently rotatable support arm;
   a plurality of guide rods attached at ends of said support arm to extend opposite to the direction in which said circular pipe is fed, said guide rods being parallel with each other and with the axis of said circular pipes so that a free end of each of said guide rods is moved to the front of said outer cutter driver and said pipe fits on said guide rod;
   a circular inner cutter attached to the end of each of said guide rods; and
   a guide member attached adjacent to said circular inner cutter on said guide rods.

* * * * *